United States Patent [19]

Ishikawa et al.

[11] 4,035,728
[45] July 12, 1977

[54] DIVERSITY RECEIVING SYSTEM

[75] Inventors: Yujiro Ishikawa; Kyo Kinoshita, both of Tokyo, Japan

[73] Assignee: Nippon Electric Company, Ltd., Tokyo, Japan

[21] Appl. No.: 646,687

[22] Filed: Jan. 5, 1976

[30] Foreign Application Priority Data

Jan. 9, 1975 Japan .................. 50-5082

[51] Int. Cl.$^2$ ......................................... H04B 7/08
[52] U.S. Cl. ............................. 325/304; 325/306; 325/369
[58] Field of Search ............... 325/56, 62, 302–306, 325/404, 2, 366–369; 343/205, 206

[56] References Cited

U.S. PATENT DOCUMENTS

| | | | |
|---|---|---|---|
| 3,350,646 | 10/1967 | Graziano et al. | 325/305 |
| 3,495,175 | 2/1970 | Munch | 325/304 |
| 3,631,344 | 12/1971 | Greenwald | 325/305 |
| 3,902,119 | 8/1975 | Skingley | 325/305 |

Primary Examiner—Benedict V. Safourek
Assistant Examiner—Jin F. Ng
Attorney, Agent, or Firm—Sughrue, Rothwell, Mion, Zinn and Macpeak

[57] ABSTRACT

A diversity receiving system having a hysteresis switching characteristic has first and second signal receiver portions supplied with at least one radio frequency signal for producing a pair of received signals, a level detection circuit provides a pair of voltages representative of the levels of the received signals, the outputs of the level detection circuit are compared to determine which one is at a higher level, a switching circuit selectively leads the higher level one of the received signals to an output terminal of the receiving system, and the level of the higher level one of the received signals is raised with respect to the lower level one which has not been led to said output terminal. In the present system, the higher level signal is selected while the reference level for detection with respect to the higher level signal is relatively lowered so that the higher level signal is more stably selected. Then, if the input signal of the unselected receiver is later selected, the reference level for detection thereof is relatively lowered. This results in alternate lowering of the reference level for detection at the detection circuit. As a result, the frequency of the switch-over is reduced while the reception is equally shared by the two receivers, maintaining the high quality of reception.

3 Claims, 6 Drawing Figures

DIVERSITY RECEIVING SYSTEM

BACKGROUND OF THE INVENTION

1. Field of the Invention

This invention relates to a diversity receiving system, and more particularly to a high-quality frequency diversity or space diversity receiving system.

2. Description of the Prior Art

The conventional diversity receiving system comprises a pair of receivers for receiving two input signals, a comparison circuit for comparing the output signals from the aforesaid receivers to determine which one is at a higher level, and a switching circuit responsive to the comparison circuit output for selecting as an output the higher level one of the receiver output signals. However, in such a conventional receiving system, the reference levels for the signal detection at the comparison circuit are set equal to each other. Therefore, the signal reception is substantially evenly shared by the two receivers. However, this involves too frequent switch-over at the switching circuit which adversely affects the signal reception quality. If the reference levels for detection are set differently, the frequency of the switchover may be reduced. However, this involves a one-sided sharing of the signal reception by one of the receivers.

SUMMARY OF THE INVENTION

It is therefore an object of the present invention to provide a high quality diversity receiving system which permits selective reception of the receiving input signals while making the two or more receivers evenly share the reception with a reduced switch-over frequency.

According to the present invention, there is provided a diversity receiving system comprising: first and second signal receiver portions supplied with at least one radio frequency signal for producing a pair of received signals; level detection means for providing a pair of voltages representative of the levels of said received signals; means for comparing the outputs of said level detection means to determine which one is at a higher level; means responsive to said comparing means for selectively leading the higher level one of said received signals to an output terminal of said receiving system; and means responsive to said comparing means for relatively raising the level of the higher level one of said received signals with respect to the lower level one which has not been led to said output terminal. In the present system, the higher level signal is selected by the selecting means, while the reference level for detection with respect to the higher level signal is relatively lowered so that the higher level signal is more stably selected. Then, if the input signal of the unselected receiver is later selected, the reference level for detection thereof is relatively lowered. This results in alternate lowering of the reference level for detection at the two detecting means. As a result, the frequency of the switchover is reduced while the reception is equally shared by the two receivers, maintaining the high quality of reception.

BRIEF DESCRIPTION OF THE DRAWINGS

The above object and features of the present invention will be more apparent from the following description taken in conjunction with the accompanying drawings, in which.

DESCRIPTION OF THE PREFERRED EMBODIMENTS

Figure 1:
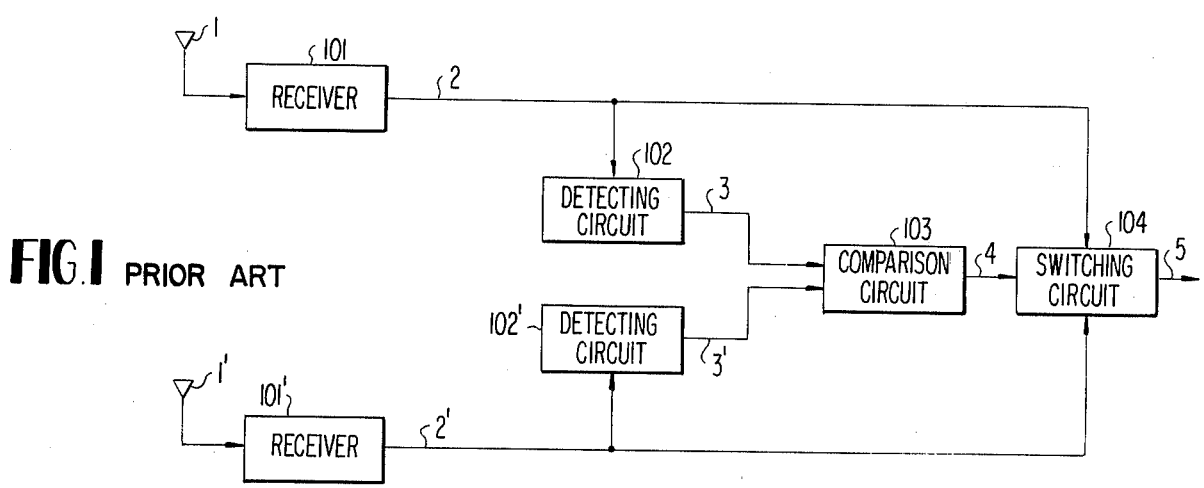
FIG. 1 is a block diagram of the prior art diversity receiving device.
Figure 3:
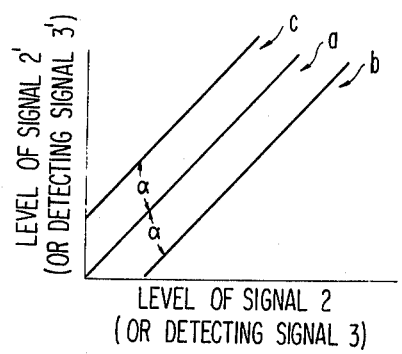
FIG. 3 is a graph illustrative of the characteristics of the detecting levels of the received input signals.

Referring now to FIG. 1, there is shown a prior art diversity receiving system. Input signals are received by antennas 1 and 1', and supplied to receivers 101 and 101', respectively. Signals 2 and 2' thus received by receivers 101 and 101' are supplied to detecting circuits 102 and 102'. The levels of output signals 3 and 3' from the detecting circuits 102 and 102' are compared with respect to their levels in the comparison circuit 103 which provides an output indicative of which signal has the higher level. A switching circuit 104 is driven so as to select either one of the output signals 2 and 2' according to the output signal 4 from the comparison circuit 103. When the detecting levels of the detecting circuits 102 and 102' are so designed as to be even as shown by a line $a$ of FIG. 3, i.e., when the aforesaid detecting levels are exchanged one for another with respect to the line $a$, the reception of the respective input radio signals is evenly shared by the two receivers. However, this results in too frequent switch-over, with the accompanying lowering in the signal receiving quality. On the other hand, when the reference levels for signal detection at the detecting circuit 102 and 102' vary one from another as shown by a line $b$ of FIG. 3, then the frequency of the switch-over may be reduced. However, this would lead to a one-sided sharing of the reception of the input signals 2 and 2' by the two receivers.

Figure 2:
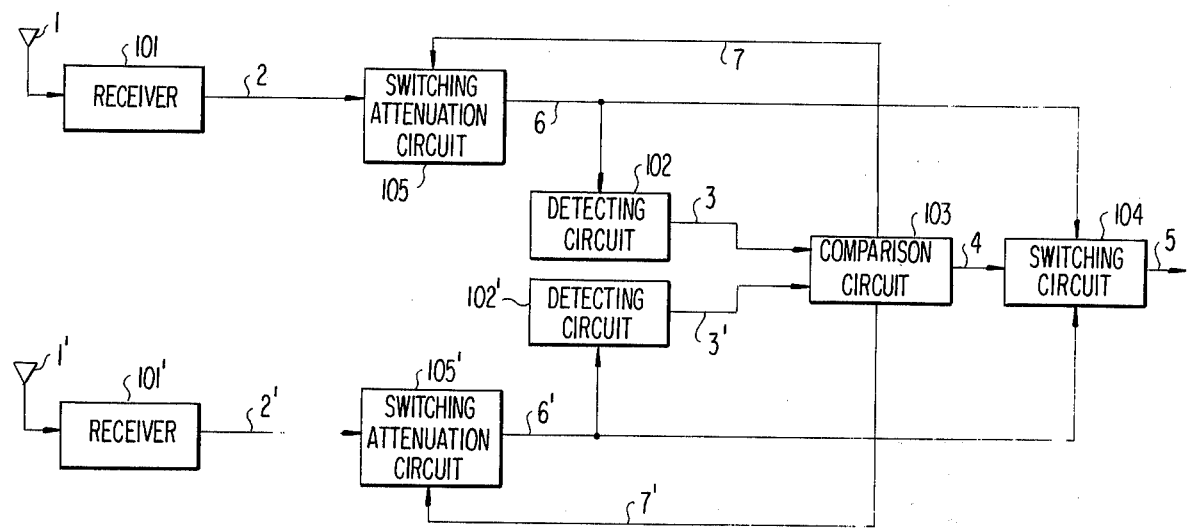
FIG. 2 and FIG. 4 are block diagrams of the diversity receiving device according to the present invention.

FIG. 2 shows a diversity receiving system according to the present invention. The system differs from the conventional one shown in FIG. 1 in that there are provided switching-attenuation circuits 105 and 105' between the receivers 101 and 101' and the detecting circuits 102 and 102', respectively, so that the switching-attenuation circuits 105 and 105' are controlled according to the output signals 7 and 7' from the comparison circuit 103.

Descriptions will now be given of the operation of the circuit of FIG. 2. For simplicity of description, it is assumed that the reference levels for detection at the detecting circuits 102 and 102' are evenly set, and that the attenuation values of the switching-attenuation circuits 105 and 105' are $\alpha$ dB and 0 dB at the initial stage, respectively, and a signal 6' is selected. With the aforesaid arrangement, the signal 2 will be $\alpha$ dB larger than the signal 2'. In other words, when the signals 2 and 2' are within a region below the line $b$ of FIG. 3, then the signal 6 will be larger than the signal 6', and these signals 6 and 6' are detected at the detecting circuits 102 and 102', respectively, while the higher-level one of the detecting signals 3 and 3' is selected at the comparison circuit 103. The output signal 4 of the comparison circuit drives the signal switching circuit 104, so that the signal 6 is switched over to the output signal 5 of the switching circuit 104. Upon the aforesaid switch-over, the attenuation values of the switching circuits 105 and 105' are switched from α dB to 0 dB and from 0 dB to α dB, respectively. As a result, the switching reference line for the signals 2 and 2' is shifted from the line b to the line c in FIG. 3. When the signal 2' is α dB larger than the signal 2 (when the signal 2' is within a region above the line c), then the signal 6' will be larger than the signal 6, so that the signal switching circuit 104 is so operated according to the signal from the comparison circuit 103 as to provide the signal 6' as an output signal 5 from the signal switching circuit 104 in a manner opposite to the previous case. Upon the aforesaid switch-over, unlike the previous case, it is assumed that the attenuation values of the switching-attenuation circuits 105 and 105' are switched from 0 dB to α dB and from α dB to 0 dB according to the output signals 7 and 7', respectively. Then, the switching reference line for the signals 2 and 2' is shifted from the line c to the line b in FIG. 3. As is apparent from the foregoing, a feature of the present invention is that, by providing a hysteresis characteristic to the switching level, the reception of the signal is evenly shared by the two receivers 101 and 101' while reducing the repetition frequency of the switch-over frequency. In addition, the receiving period of the respective input signals may be varied by selecting one of the lines b and c, while the switching period may be varied as well. In addition, the switching level may be set at the lines a and b or the lines a and c. In this case, the switching-attenuation circuits 105 or 105' may be omitted.

Figure 4:
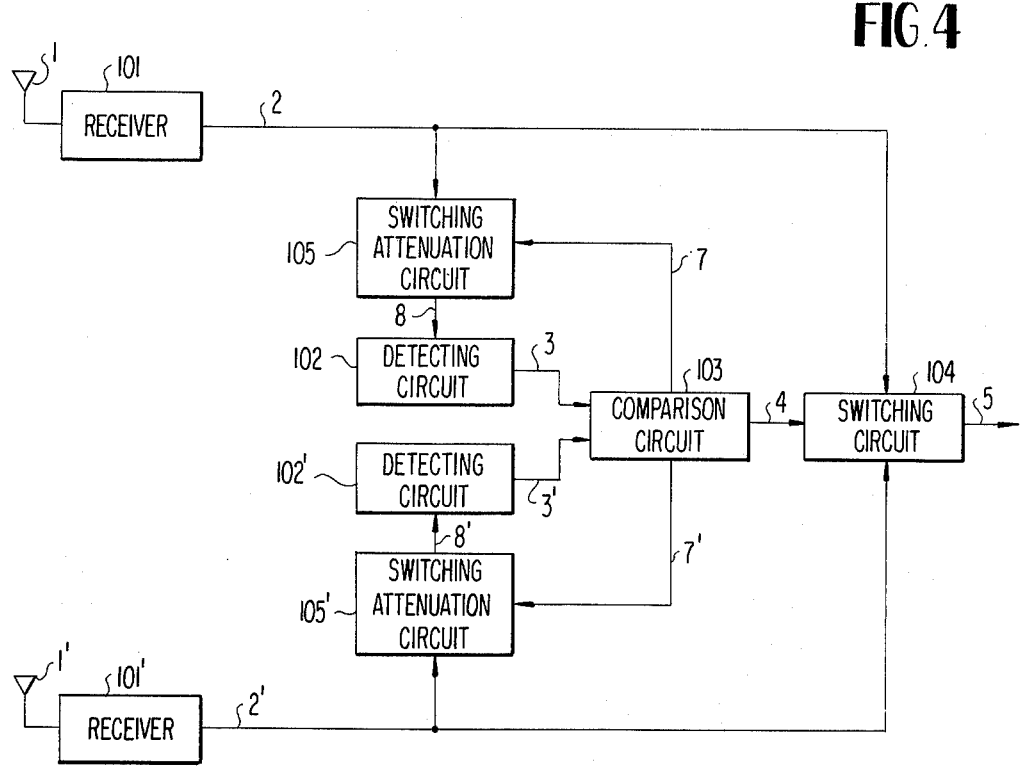

FIG. 4 shows another embodiment of the present invention. This embodiment differs from that shown in FIG. 2 in that the switching-attenuation circuits 105 and 105' are connected in parallel with the receiving signals rather than in series therewith. Since the above embodiment is devoid of switching-attenuation circuits 105 and 105' in the paths of the receiving input signals, there may be achieved an advantage in that the switching of these circuits will not affect the receiving input signals. The operation of the embodiment of FIG. 4 is similar to that of the embodiment given in FIG. 2, and so is the advantage. In addition, it is apparent that the switching-attenuation circuits 105 and 105' may be provided between the detecting circuits 102 and 102' and the comparison circuit 103.

Figure 5:
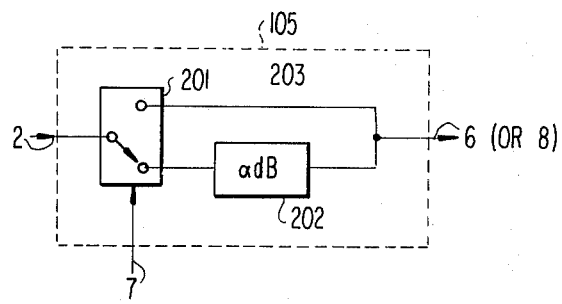
FIG. 5 is a circuit diagram of the simplest arrangement of the switching-attenuation circuit of FIG. 4.

FIG. 5 shows the simplest arrangement of the switching-attenuation circuit as shown in FIGS. 2 and 4. According to the aforesaid circuit arrangement, a switch 201 is actuated according to the signal from the comparison circuit 103 (for instance, a differential amplifier), so as to switch the attenuation value α dB of an attenuator 202 to the attenuation value 0 dB of a strip line 203, or from 0 dB to α dB.

Figure 6:
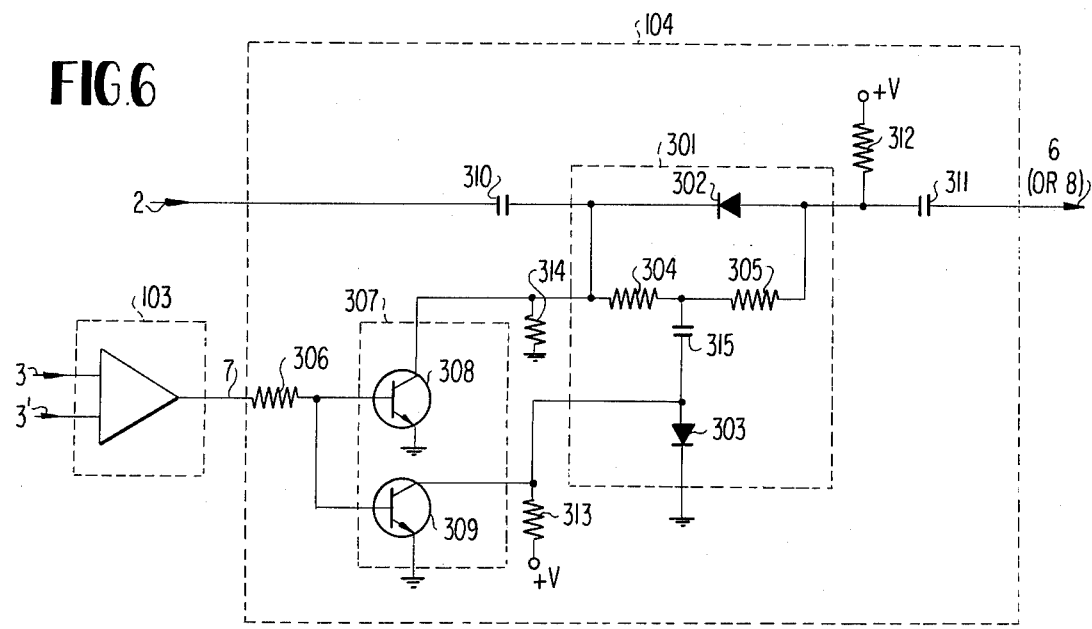
FIG. 6 is another embodiment of the switching-attenuation circuit of FIG. 4.

FIG. 6 shows an example of the switching circuits 104 of FIGS. 2 and 4. According to the aforesaid example, a bridge T type variable attenuator 301 having PIN diodes may be switched over according to the signal 7 from the comparison circuit 103. The attenuator 301 consists of PIN diodes 302, and 303, resistors 304 and 305, and a capacitor 315. Firstly, when the transistors 308 and 309 for the switch 307 are non-conducting, the attenuation value of the attenuator 301 is set at α dB by means of bias resistors 312 and 313. Then, when the transistors 308 and 309 are rendered conducting according to the signal 7, then an electric current flows from an electric power source +V by way of a resistor 312 and PIN diode 302 into the transistor 308, so that the level of the signal 2 will be even with that of the signal 6, assuming that the resistance of the PIN diode 302 is zero, i.e., the attenuation value is 0 dB. In this respect, it is necessary that an electric current be so controlled as not to flow through the resistor 313 to the PIN diode 303 by bringing the transistor 309 in conducting condition, i.e., the signal 6 should not be reduced by bringing the resistance of the PIN diode to infinity.

The receivers, detecting circuits and switching circuits as shown in FIGS. 2 and 4 may be of known types. In addition, while the switching-attenuation circuit is used in the aforesaid embodiments so as to provide an equivalent hysteresis characteristic to the detecting level, it is apparent that the detecting level of the detecting circuit may be directly varied.

As is apparent from the foregoing description of the invention, there may be achieved a high quality diversity receiving device which may selectively receive signals, with the signal reception evenly shared with a reduced switch-over frequency.

The foregoing description has been given for illustrative purposes only and is not intended to unduly limit the scope of the invention.

What is claimed is:

1. A diversity receiving system having a hysteresis switching characteristic comprising:
    first and second signal receiver portions supplied with at least one radio frequency signal for producing a pair of received signals;
    level detection means for providing a pair of voltages representative of the levels of said received signals;
    means for comparing the outputs of said level detection means to determine which one is at a higher level;
    switching means responsive to said comparing means for selectively leading the higher level one of said received signals to an output terminal of said receiving system; and
    means responsive to said comparing means for relatively raising the level of the higher level one of said received signals with respect to the lower level one which has not been led to said output terminal.

2. A diversity receiving system as claimed in claim 1, wherein said relative level raising means includes at least one attenuator inserted between said receiver portions and said switching means.

3. A diversity receiving system as claimed in claim 1, wherein said relative level raising means includes at least one attenuator inserted respectively between said receiver portions and said level detection means.

* * * * *